United States Patent [19]
Plummer

[11] 3,848,980
[45] Nov. 19, 1974

[54] PROJECTOR APPARATUS AND SYSTEM EMPLOYING UNIQUE SCREEN

[75] Inventor: William T. Plummer, Concord, Mass.

[73] Assignee: Polaroid Corporation, Cambridge, Mass.

[22] Filed: July 27, 1973

[21] Appl. No.: 383,082

Related U.S. Application Data

[63] Continuation of Ser. No. 174,461, Aug. 24, 1971, abandoned.

[52] U.S. Cl.................... 352/81, 350/128, 352/104, 353/76, 353/77
[51] Int. Cl. ......................................... G03b 41/00
[58] Field of Search .......... 350/127, 128, 129, 117; 353/31, 32, 70, 74, 76, 77, 78; 352/104, 58, 81, 70

[56] References Cited
UNITED STATES PATENTS

| | | | |
|---|---|---|---|
| 2,326,042 | 8/1943 | Lessman | 350/128 X |
| 2,464,220 | 3/1949 | Duncan et al. | 353/77 |
| 2,529,701 | 11/1950 | Maloff | 350/128 |
| 3,241,429 | 5/1966 | Rice et al. | 350/128 X |
| 3,253,505 | 5/1966 | Miller | 353/70 |
| 3,472,588 | 10/1969 | Dine et al. | 353/76 X |
| 3,578,841 | 5/1971 | Elmer | 350/127 |
| 3,598,470 | 8/1971 | Vetter | 350/117 |

FOREIGN PATENTS OR APPLICATIONS

| | | | |
|---|---|---|---|
| 592,815 | 9/1947 | Great Britain | 350/120 |

*Primary Examiner*—Richard M. Sheer
*Attorney, Agent, or Firm*—David R. Thornton

[57] ABSTRACT

A rear projection viewer employing a rearwardly inclined viewing screen having a lenticulated element for transmitting projected images substantially uniformly over a given viewing zone which is directed downwardly from an axis normal to the screen in partial compensation for its angle of inclination. The screen includes a forwardly positioned lenticular lens and a rearwardly positioned Fresnel lens having a rear planar surface of fine grain surface roughness which lightly diffuses the projected image and additionally provides a suitable surface for image focusing. Preferably, the rear projection viewer is intended for use with color additive film of the type in which an array of parallel color stripes is employed, and the periodicity of appropriate lenticular elements is related to the periodicity of the film stripes to reduce moire between the two and thereby minimize color bands in the viewed image. Specifically, a plurality of the lenticular elements, arranged in parallel relation to the projected image of the film stripes, are provided in an numerical ratio of small intefers thereto, such as a ratio of 3 to 2.

6 Claims, 5 Drawing Figures

PATENTED NOV 19 1974 3,848,980
SHEET 1 OF 2
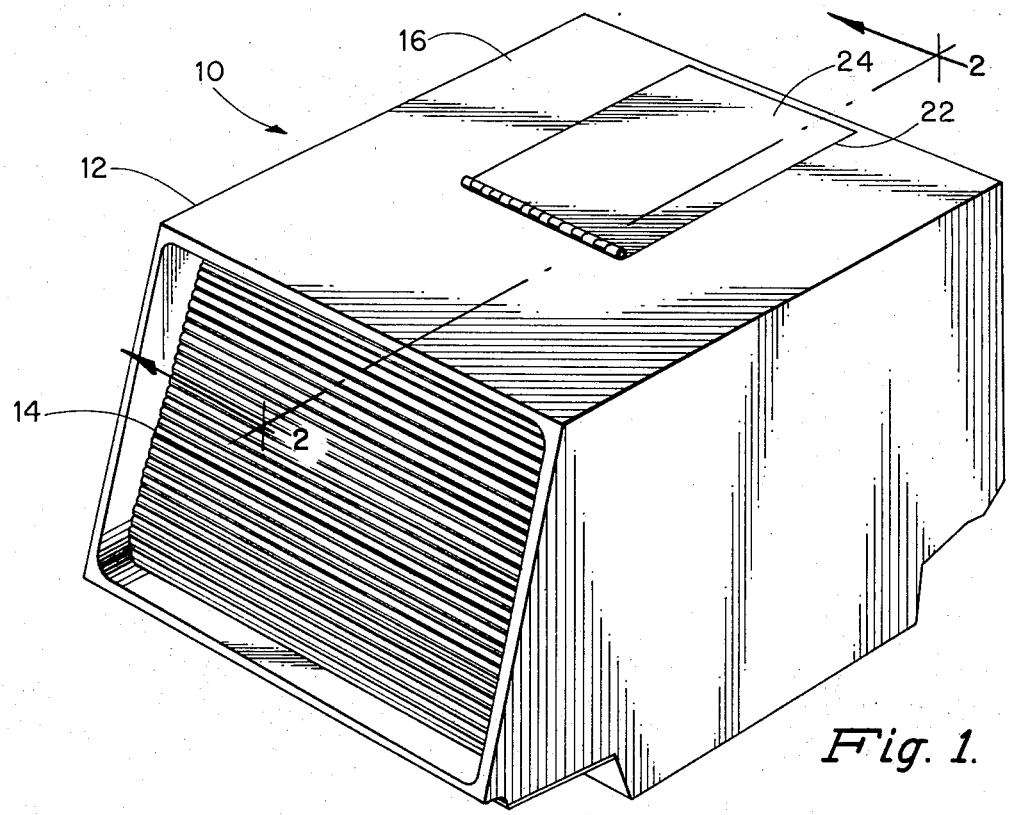
Fig. 1.
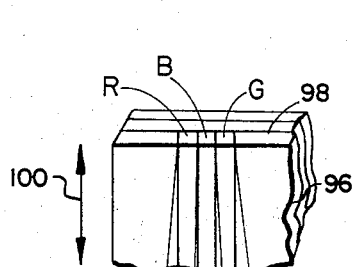
Fig. 5.
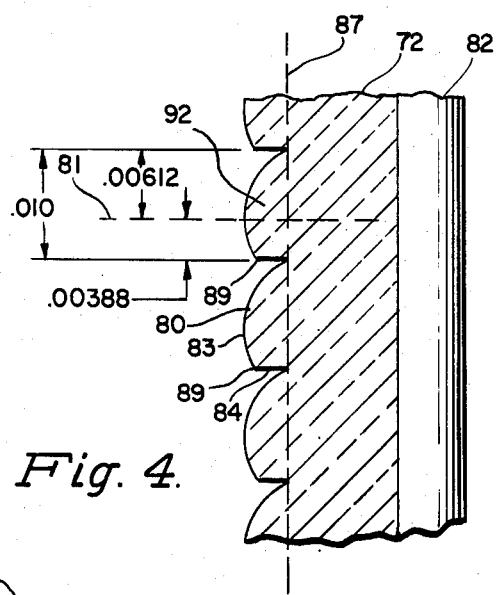
Fig. 4.
INVENTOR
WILLIAM T. PLUMMER
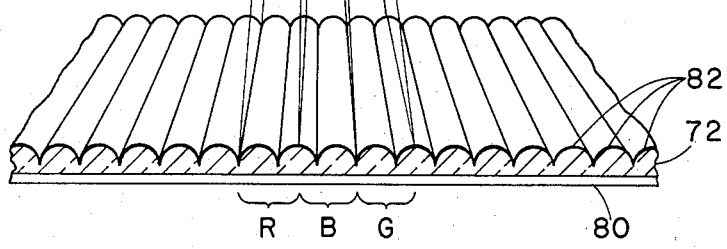
ATTORNEYS INVENTOR
WILLIAM T. PLUMMER
BY Brown and Mikulka
and
David R. Thornton
ATTORNEYS

PROJECTOR APPARATUS AND SYSTEM EMPLOYING UNIQUE SCREEN

CROSS REFERENCE TO RELATED APPLICATIONS

This is a continuation of application Ser. No. 174,461, filed Aug. 24, 1971 now abandoned.

BACKGROUND OF THE INVENTION

1. Field of the Invention

This invention relates to photographic apparatus and more particularly to improved motion picture rear projection viewer apparatus.

2. Description of the Prior Art

Rear projection viewer apparatus in which the projection system and the viewing screen are combined in a single structural unit are available in the prior art. Among other advantages, this type of projector apparatus can provide a compact portable unit which permits satisfactory pictorial displays in high ambient light conditions, and is particularly suited to those instances where available space is limited. Conventionally, apparatus of this type employ a lenticular screen arrangement which directs the projected images over a controlled viewing zone centered along an axis normal to the screen, and hence, do not generally provide a suitable arrangement for directing the viewing zone to an audience located off the screen axis.

In apparatus of this type where a compact system is employed, wide angle projection is commonly utilized, and hence, the viewing screen must also provide a collimating function. This generally results in a complex expensive screen structure in which a collimating lens and a lenticular lens are combined in an integral unit.

Further, since lenticular screens utilize a plurality of contoured lenticules for controlled uniform dispersion of the transmitted image over a given zone and are designed for viewing at a discrete distance they are inappropriate for the close-up viewing generally required for focusing of the projection system. A further disadvantage of such projection systems is that the lenticulated screen produces an annoying moire pattern of coarse color stripes when the apparatus is employed with color additive film of the type in which an array of color stripes are provided in a repetitive sequence to produce the colored image.

A highly compact, rear projection viewer designed for operation of a motion picture film cassette is described in copending patent application Ser. No. 174,373 of Philip G. Baker et al. filed July 27, 1973 and entitled "Projector Apparatus" and assigned to the same assignee as the present invention, now U.S. Pat. No. 3,701,127. The projector unit described in the copending application provides a highly compact unit employing a lenticulated viewing screen which for reasons of compactness is inclined rearwardly over the base of the apparatus. Inasmuch as the viewing screen is inclined, it is desirable to provide a screen arrangement which directs the transmitted images over a given viewing zone, displaced from the axis perpendicular to the screen.

Consequently, it is an important object of this invention to provide an improved photographic projection apparatus.

Another primary object of this invention is to provide a rear projection viewer having an improved screen arrangement.

Still another object of this invention is to provide a rear projection viewer apparatus having a screen element configured to facilitate image focusing.

A further object of this invention is to provide an improved rear projection screen.

A still further object of this invention is to provide an improved photographic system and apparatus for projection of photographic film having uniformly ordered image forming segments.

SUMMARY OF THE INVENTION

The present invention provides a projection system and apparatus for displaying scenes recorded on photographic film within a compact viewer unit which comprises means for projecting images recorded on such film strip to the rear of a viewing screen which transmits the projected images over a given viewing zone centered off the projection axis.

In the preferred embodiment, the apparatus comprises a housing defined in part by a front viewing screen which is inclined to the longitudinal axis of the housing. The screen is lenticulated to provide uniform dispersion of the transmitted image over a precise viewing zone and a plurality of the lenticules include an abrupt step in their otherwise smoothly curved surfaces which effectively rotates the viewing zone off the axis normal to the screen in partial compensation for the inclination of the latter. The screen comprises a pair of spaced sheet-like elements, one of which is a cross-lenticulated element, which determines the viewing zone, and the other is a collimating lens element which also provides very slight diffusion of the transmitted image. The latter sheet-like element is interposed between the lenticulated element and the projection means so as to intercept the projected images and transmit them in a collimated arrangement to the lenticular element. The lenticular sheet includes a plurality of parallel rib-like lenticules on each surface, with the lenticules of one surface mutually perpendicular to those of the other surface, and the collimating sheet includes a Fresnel configuration formed in its forward surface and a fine grained rear surface which is configured to mildly diffuse the image and to also present a suitable surface for image focusing. Additionally, the apparatus includes means for focusing the projected image in the plane of the screen and means for viewing the rear surface of the latter during the focusing operation.

Preferably, the projector apparatus is adapted for projection and viewing of photographic film of the color additive type in which an array of uniformly ordered image forming segments such as parallel color stripes are provided in a repetitive sequence to produce a colored image, and the lenticular element includes a plurality of lenticules arranged in parallel relation to the images of the film stripes and having large difference in periodicity thereto so as to preclude transmission of a coarse color pattern. The ratio of the designated lenticules to the film stripe images should be a ratio of small integers such as smaller integers than that of 5 to 4 and preferably is a ratio utilizing the integers 3, 2 or 1; for example, 3 to 2, 3 to 1, 2 to 1, or 1 to 1.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof, will be best understood from the following description of the preferred embodiment when read in connection with the accompanying drawings wherein like numbers have been employed in the different figures to denote the same parts and wherein:

FIG. 1 is a diagrammatic view in perspective of a motion picture viewer embodying the features of this invention;

FIG. 4 is a still further enlarged, fragmentary view of the lenticular element of the viewing screen as illustrated in FIG. 2; an FIG. 5 is a diagrammatic view illustrating the relationship of the screen lenticules to striped photographic film.

DESCRIPTION OF THE PREFERRED EMBODIMENT

Figure 2:
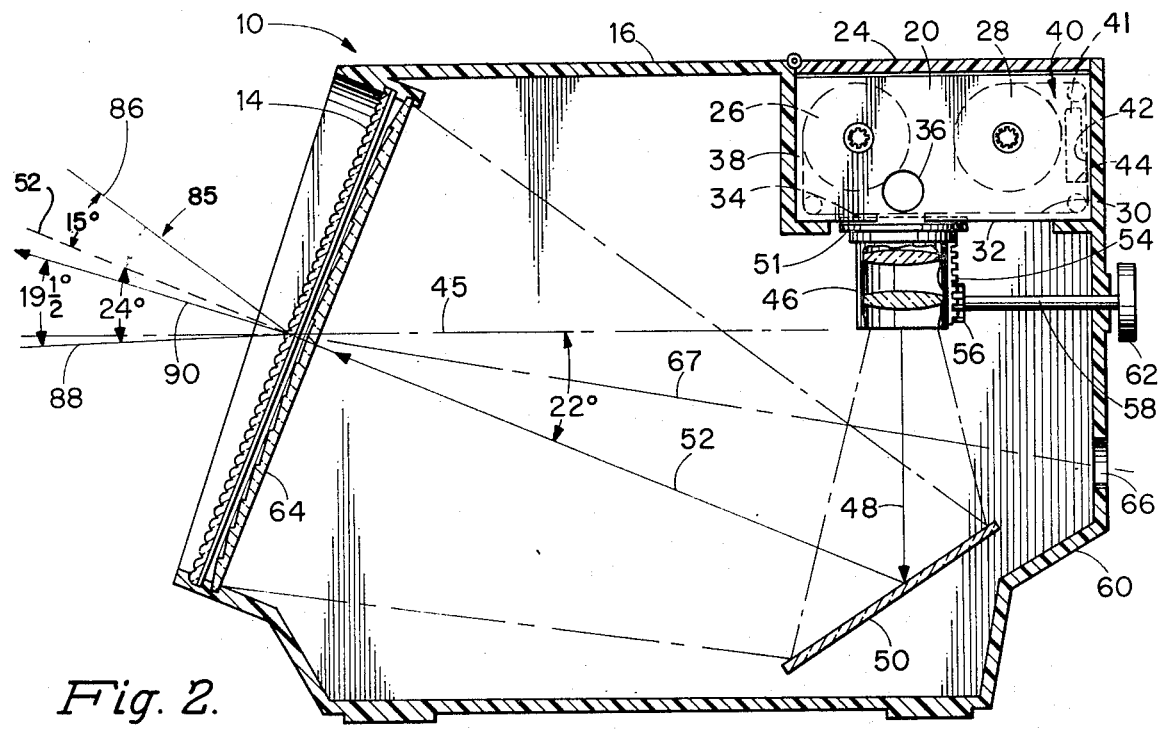
FIG. 2 is a sectional view taken along the line 2—2 of FIG. 1.

As shown in FIGS. 1 and 2, the photographic apparatus of the present invention preferably takes the form of a rear projection viewer 10 comprising a box-like housing 12 defined in part by a front viewing screen 14. Positioned rearwardly of screen 14 and in adjoining relation to the top surface 16 of the housing 12 is a cassette-receiving well 18 which is adapted to hold a motion picture film cassette 20 as shown in FIG. 2. The cassette-receiving well 18 extends to and is in communication with an opening 22 in the top surface 16 of the housing 12. Pivotally mounted at the forward edge of opening 22 is a door member 24 for controlling access to cassette-well 18. Hence, the door 24 is mounted for pivotal motion between a closed position, blocking the opening 22, and an open position permitting insertion and removal of the cassette 20.

The cassette 20 is a multipurpose motion picture film cassette and may, for example, take the form of the cassette described in copending application Ser. No. 813,469 of Rogers B. Downey filed Apr. 4, 1969, now U.S. Pat. No. 3,608,455 which is designed for exposure, processing and projection without removal of its film from the cassette casing. Preferably, the cassette comprises a generally flat, parallelepiped casing enclosing a pair of motion picture film spools 26 and 28 to which a motion picture film strip 30 is attached so as to be disposed for transport between one spool and the other in an arrangement wherein portions of the film are advanced across a film gate or opening 34 which facilitates projection of the film images in a manner to be subsequently described.

Means are also provided in the cassette 20 to permit entrance of suitable illumination and for redirecting such illumination in a downward direction through the film 30 and out of the opening 34. For example, in this embodiment an opening or aperture 36 is provided in one side wall 38 which adjoins the lower edge 32 of the cassette 20, and a reflector element (not shown) such as a mirror or prism is included within the cassette to redirect the light entering aperture 36, out of the projection station opening 34. Hence, an illumination means (not shown), for example, a conventional projection lamp such as DNF Halogen lamp 150 QTB/LVD marketed by the Photolamp Products Division, Sylvania Electric Products, Inc. of Salem, Massachusetts, is mounted in the apparatus in an adjoining relation to the aperture 36 so as to suitably direct illumination into the cassette 20. It will therefore be appreciated that the cassette opening 34 serves in part to define an exposure station during a first transport of the film strip 30 thereacross and a projection station during subsequent passes of the film strip thereacross.

Carried within cassette 20 is a processing station 40, such as described in the aforementioned copending applications, which includes a processor 41, designed for selective operation for distribution of an appropriate processing fluid (not shown) over the film 30 during transport of the latter past the dispensing surface or processor mouth 42, located near the bottom 44 of the processor. In the preferred embodiment, the processor 41 is perpendicular to the plane of the projection station opening 34, and is intended for operation in an upright attitude which facilitates gravitational flow of its fluid to the lower dispensing mouth 42. Consequently, the well 18 is adapted to locate the cassette 20 in the vertical plane with its projection edge 32 parallel to the longitudinal axis 45 of the viewer 10, and hence, in a horizontal plane.

Included within housing 12 in adjoining relation to the cassette-receiving well 18 are means (not shown) for driving spools 26 and 28 and for advancing film 30 across opening 34. For example, appropriate drive shafts (not shown) are adapted to engage the spools 26 and 28 and suitably rotate them, and a conventional claw arrangement (not shown) is adapted to engage film 30 in a conventional manner in the vicinity of the cassette opening 34 so as to progressively advance incremental sections of the film thereacross.

Mounted beneath the cassette-receiving well 18, in alignment with the opening 34 is a lens assembly 46, adapted to project an image of the film presented at the opening 34 and focus it in a given plane at a given distance from film 30. The lens assembly 46 directs an image vertically downward along an optical axis designated as 48 to a reflective means such as a mirror 50, mounted in the path of the axis 48 and at an acute angle thereto so as to redirect the projected track forwardly along an upwardly inclined axis 52 to the rear of the screen 14. The latter is preferably disposed normal to axis 52 to reduce pictorial distortion and, as later explained in detail, with regard to FIG. 4, includes means for redirecting the viewing axis downwardly to partially offset the upward inclination of axis 52.

Also included within the apparatus housing 12 are means for focusing the projected images on the screen 14. These means include an arrangement wherein lens assembly 46 is displaceably mounted for movement along the optical path 48. For example, lens assembly 46 is slidably mounted in sleeve 51 which is conventionally affixed to the bottom 53 of well 18. A rack 54 is mounted on the lens assembly 46 and engaged by a pinion gear 46 which is coupled, in turn, to a rod 58. The latter extends through the rear wall 60 of the housing to a focus adjustment knob 62. Further, as later explained in more detail in regard to FIG. 3, the rear surface 64 of the screen 14 is a relatively flat, planar surface configured to facilitate focusing of the projected image, and consequently, the apparatus includes means for viewing this rear surface. For example, in the illustrated embodiment, the viewer housing 12 includes an aperture or peep-hole 66 in the rear wall 60 so as to permit direct view of the rear surface 64 of the screen. The aperture 66 and the knob 62 are located in close proximity, (within convenient arm reach) so as to permit viewing of the rear screen surface 64 by the operator while the latter rotates the knob to alter the focus of the projected images.

To facilitate focusing, the aperture 66 is positioned in the rear wall 60 so as to permit viewing of the screen surface 64 along an axis 67 which forms approximately a right angle with the screen 14. Preferably, the viewing axis 67, or at least the portion thereof close to the screen should form greater than a 45° angle, and preferably greater than a 60° angle with the rear screen surface 64. Advantageously, the viewing axis 67 may also be folded (not shown) by one or more mirrors (not shown) to extend the viewing axis through any surface of the viewer housing 12.

In this embodiment, the mirror 50 is positioned at an angle of 34° with respect to the longitudinal axis 45, and hence, redirects the vertical projection axis 48 along an axis 52 which is inclined by approximately 22° above the horizontal. As previously indicated, however, the screen 14 redirects this optical axis downwardly so as to uniformly transmit an image over a limited viewing zone which includes the longitudinal axis of the viewer. This is accomplished in the preferred embodiment by a lenticular structure which uniformly emits or projects an image over a particular solid angle 85 (whose vertical extent for one lenticule is shown) and additionally redirects this viewing angle approximately 4½° downwardly from the optical axis 52, normal to the screen, so that the viewing zone intercepts the longitudinal axis 45, forwardly of the viewer. That is, since the apparatus is intended for mounting on a table of standard height and for viewing by at least a partly seated audience whose eye level will often be at approximately the height of the screen 14. The lenticules are designed to provide a controlled limited viewing zone which includes such an audience area located along the longitudinal axis of the viewer.

Figure 3:
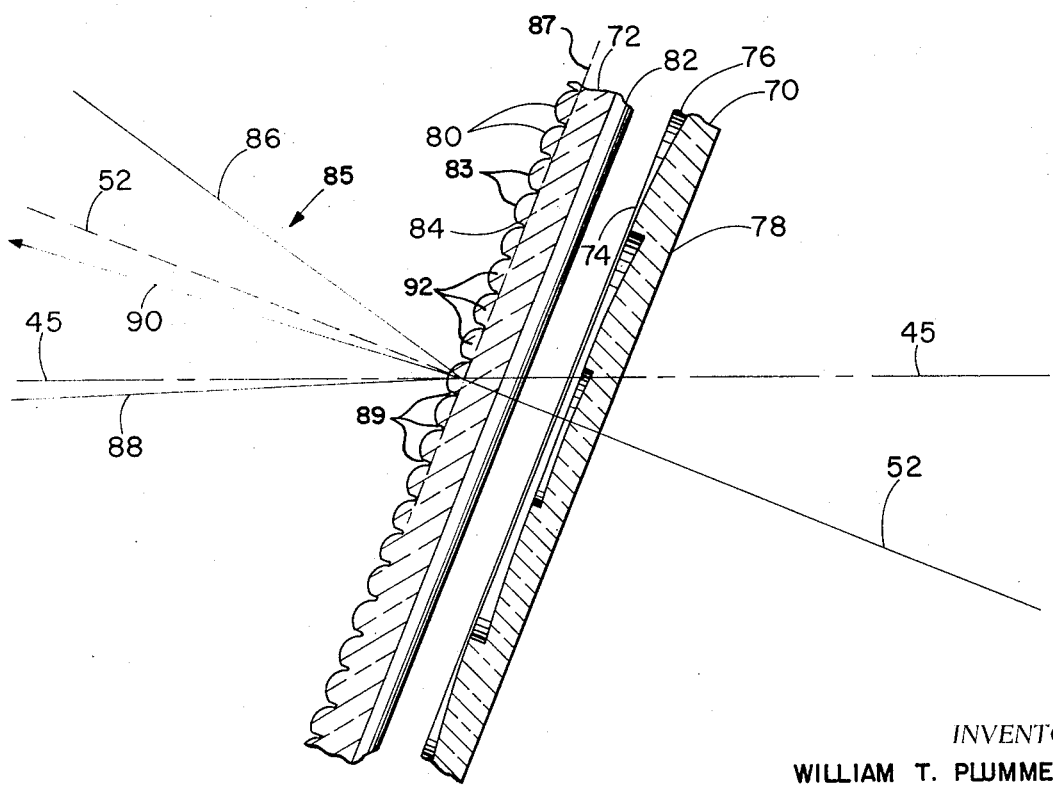
FIG. 3 is an enlarged, fragmentary view of the viewing screen as illustrated in FIG. 2.

This is more clearly explained in FIG. 3 wherein the screen 14 is illustrated as a lens assembly which includes a rearwardly positioned, sheet-like element 70 closely spaced (i.e. 3/16 inch) from a forwardly positioned, sheet-like element 72. Formed in the front surface 74 of the rear element 70 is a circular Fresnel lens 76 of conventional design which is adapted to collimate the projected rays (redirected by mirror 50) and redirect them in a substantially parallel arrangement through the forward screen element 72. Both the elements 70 and 72 are formed of conventional, transparent material such as clear plexiglass so as to transmit the projected image without large loss of light. The rear surface 78 of the rear element 70 is fine grained to provide a very moderate diffusion of the projected image which obscures diffraction at the lenticule edges and also provides a surface which facilitates image focusing. The diffusing surface 78 is configured to produce small angle scattering, (approximately 2 to 3°), as compared to the diverting angle of the lenticules; so that its very slight diffusion does not interfere with the function of the sharp cut-off of the viewing zone produced by sheet 72. However, this mild diffusion will hide the unavoidable, minor tool imperfections in the lenticules which produce diffraction of the transmitted light. The fine grain surface may be suitably produced in surface 78 by an impression from a nickel surface tool formed by electroplating a glass surface which was first prepared as a ground glass surface and then subsequently lightly etched with hydrofluoric acid.

The forward element 72, which determines the viewing zone, is a crossed-lenticular lens having a plurality of parallel, contiguous rib-like lenticules 80 and 82 disposed in crossed relation on the front and rear screen surfaces respectively. Hence, the lenticules of one face are orthogonal to the lenticules of the other face such that each set of lenticules provides controlled uniform dispersion of the transmitted radiation in respective orthogonal planes.

Although the lenticules may be either convex or concave ribs, they are preferably convex members having a profile contour which includes a portion having a curvature approximately that of an ellipse which provides a substantially uniform dispersion of the projected light over a precise viewing zone with a substantially sharp cut-off at the zone boundaries. It should be understood, however, that in alternative arrangements, other shapes including substantially circular or parabolic curvatures which do not produce as precise a uniformity of illumination or such sharp cutoff at the boundaries would also be useful.

For general use, the screen lenticules are designed fine enough (i.e. in cross-section) so that particular lenticules cannot be resolved at normal viewing distance from screen (for example, 5 to 10 feet) and yet coarse enough so that diffraction images of the projection exit pupil as seen through the screen overlap to form a continuum of light. A lenticular screen 50 to 150 lenticules per inch will satisfy these general requirements. Hence, a typical screen is designed in accordance with the present invention may be formed with approximately 100 lenticules per inch. However, in the preferred embodiment, as subsequently explained in detail in regard to FIG. 4, the number of rear lenticules, which are aligned with the film stripes, deviates slightly from the above since such is related to the number of color stripe segments of the particular photographic film employed. Consequently, in an exemplary embodiment, the front lenticules number 100 per inch, whereas the rear lenticules number 94 per inch. In any case, all of the lenticules provide a curved surface, close to a portion of an ellipse, which is configured to provide a substantially uniform dispersion of the transmitted illumination over a predetermined angle. However, as explained below in detail in regard to FIGS. 3 and 4, the substantially elliptical curvature of the front lenticules are disrupted so as to reduce their angle of dispersion and effectively rotate the viewong zone. In the given example, the lenticular curvature is primarily designed to produce an angle of 48°. The latter having been found to be suitable for a relatively small audience positioned several feet forward of the viewer. Of course, where smaller or larger audience areas are desired, the viewing angle of the lenticules may be appropriately modified.

As shown in FIG. 3, the longitudinal axis 92 of forward lenticules 80 lie in horizontal planes, hence, these lenticules control the dispersion of the radiation over a vertical angle 85, for example, as bounded by lines 86 and 88. Consequently, in the improved apparatus of the invention, these lenticules are made asymmetrical in cross-section to rotate the viewing angle downwardly in partial compensation for the inclined screen position. Preferably, the lenticules 80 are identical convex ribs, disposed in a contiguous relation, and having a profile contour including a smoothly curved, approximately elliptical surface portion 83 and a planar lower surface portion 84 which forms a sharp increase in slope of the contour, or that is an abrupt step or discontinuity 89 in the lowermost edge of the curved surface portion. This step 89 eliminates upper portions of, or that is, lowers the upper boundary 86 of the viewing angle and consequently results in not only a reduced angle but more importantly a downward rotation of its bisecting axis, designated as 90 in this figure. In the illustrated embodiment, each planar surface 84 is disposed parallel to the lenticule axis 92 and substantially normal to the plane 87 of the screen so as to provide a step, or that is, a sharp increase in the slope of the lenticule surface 83. This asymmetrically limits the angle of dispersion in the plane normal to the axis 92, i.e., in the vertical plane and rotates the viewing zone accordingly.

In this example, the width of each lenticule 80 as measured in a direction transverse to axis 92 and parallel to the plane 87 of the screen element 72, is 0.010 inches as to provide 100 lenticules per inch. The surface curvature of portion 83 is symmetrical around a plane of symmetry 81, normal to the screen and parallel to axis 92 as shown in FIG. 5. Hence, the curved surface 83 is foreshortended, below plane 85 by its intersection 89 with the plane surface 84, in an amount designed to lower the upper dispersion boundary 86 by approximately 9° (See FIGS. 2 and 3). Hence, in this example, the surface 84 is disposed 0.00388 inches from the plane of symmetry. Stated otherwise, the curved surface 83 is a smoothly curved surface generated symmetrically to either side of the indicated plane 81. On the upper or undisturbed side of the lenticule, the curved surface 83 extends from plane 81, 0.00612 inches as measured in the imaginary screen plane shown at 87. The lower side of the lenticule extends in like curvature for a distance of 0.00388 inches where it intersects surface 84 which extends rearwardly to plane 87. Consequently, the curvature of surface portion 83 is such that if the lenticule was uncut, and hence, the surface 83 was extended 0.00612 inches to either side of the plane of symmetry 85 (which is true of the rear lenticules 82) the angle of dispersion would be 48°. With the cut or step, however, the upper boundary is lowered. In this case, the angle is reduced to 39° and its center axis rotated accordingly in the direction of the step 84. Of course, if the plane surface 84 is moved closer to the plane of symmetry 81 the viewing angle will be further reduced and the bisector rotated further from the normal to the screen. Conversely, increasing the distance between the surface 84 and the plane 81 rotates the bisector towards the normal.

As indicated above, the rear lenticules include an undisturbed curved surface, shown in plan view in FIGS. 3 and 4, which is identical in curvature to surface 83 and is extended 0.00612 inches to either side of its plane of symmetry (not shown) which is, of course, normal to the plane 87 of the screen and the axes 92.

Consequently, in this specific embodiment the solid viewing angle, as measured in a horizontal plane, extends 24 degrees to either side of axis 45 of the viewer and as measured in a vertical plane extends 15 degrees above and 24 degrees below the longitudinal axis 45. Hence, its bisecting axis 90 is rotated downwardly 4½° from the axis 52 normal to the screen as shown in FIG. 2.

Preferably, the viewer is designed for projection of photographic film in which the recorded image is formed in part by a repetitive series of image forming segments arranged in a regular array and in particular for color additive film in which an array of parallel color segments or stripes are provided in a repetitive sequence of colors, such as the primary's red, green and blue, for presenting an image in full color. Hence, the lenticular screen, which represents a periodic structure superimposed on the periodic structure of the striped film, is appropriately constructed to minimize moire from this source.

As previously indicated, a lenticular screen having 50 to 150 lenticules per inch is generally satisfactory, however, when film having segmented image elements is employed, as in the preferred embodiment, where striped, color additive film is utilized, a coarse stripe pattern can result in the viewed image from interaction between the images of the film stripes and those lenticules which are in parallel relation to them. Now, in the preferred screen arrangement, the rear lenticules 82 are disposed in parallel rows in the vertical plane and consequently are parallel to the projected images of the longitudinal stripes of the photographic film. Hence, these lenticules 82 are related to, or coordinated with the film stripes to provide a large difference in periodicity therebetween. That is, they are provided in a numerical ratio to the images of the film stripes which is a ratio of small integers. A ratio such as not more than 5:4 is desirable and ratios of the integers 3, 2 and 1 are preferred. For example, ratios of 3 to 2, or 3 to 1, 2 to 1 or 1 to 1 are suitable.

Referring to FIG. 5 wherein a 3 to 2 relationship between the vertical lenticules 82 and the film stripes is illustrated, three lenticules are configured to equal the sum of the width of the images of two stripes as measured in the screen plane. Herein, a fragment of film 96 is shown in perspective with a cross-sectional cut 98 taken transverse to the longitudinal axis 100 of the film, along with one sequence of film stripes designated as RBG respectively (greatly exaggerated in size) and with their illustrated projection paths to the lenticular lens element 72. For clarity, other elements of the film such as its base etc., and of the projection system including collimating element 70 are omitted. In this figure, the projected image of each stripe is illustrated as coinciding with the edge of at least one lenticule, however, it should be understood that registration between the stripe images and the lenticules is not necessary to preclude the projection of a coarse color pattern. What is important, is that the difference in periodicity between the lens and the film stripe images be large. The latter is, of course, insured by relating the two in a ratio of small integers.

Inasmuch as film having 3,000 film stripes per inch is intended for use in the preferred projection system, and the latter produces a given magnification which results in 63 stripes per inch displayed at the screen, 94 lenticules per inch are provided for rear lenticules 82 so as to provide a ratio of these lenticules to film stripes in the order of 3:2. This produces a fine, rather than coarse color pattern. As previously indicated, the front lenticules 80, whose longitudinal axes 92 lie in horizontal planes (orthogonal to the longitudinal extension of the film segment images) are 100 per inch since the latter does not effect the color pattern.

Certain dimensions have been indicated on FIGS. 2, 3 and 4 in order to impart a full understanding of the present invention. However, it is to be expressly understood that these dimensions are exemplary only and are not to be interpreted as restricting the scope of Applicant's invention in any manner.

In an exemplary embodiment, an apparatus housing measuring approximately 10 inches in height, 10 inches in width and 16 inches in length was employed with a lenticular screen constructed as set out above, and measuring 7.2 inches high and 9.2 inches wide. A well, disposed in the top surface at the rear of the unit was made to accept a cassette, measuring 5 inches in length, 2¾ inches in height and ⅝ inches wide. A projection lens having a speed of f/0.92 and 0.35 inches focal length mounted beneath the cassette-well produced a total projection distance or track length of 17 inches from film to screen, and the latter was folded by a single mirror placed at the base of the cabinet, approximately 5 inches below the film.

Those familiar with the motion picture arts will readily appreciate the novel and highly unique advantages of this invention which provides a compact viewer apparatus having a simplified, two element screen arrangement which appropriately directs the projected image over a controlled viewing zone which is related to both the orientation of the viewer screen and the audience. Further, the screen includes a plane diffuser surface which facilitates image focusing and a lenticular element configured to minimize the line pattern resulting from the projection of striped film.

It should be understood that this invention may be practiced or embodied in still other ways without departing from the spirit or essential character thereof. Hence, the preferred embodiment herein is illustrated and not restrictive, and the scope of the invention being indicated by the appended claims and all variations which come within the meaning of the claims are intended to be embraced therein.

What is claimed is:

1. In a projection system including photographic film of the type having a recorded image formed at least in part by a repetitive series of image forming segments arranged in a regular array, the improvement comprising a screen configured for projection of such recorded images thereto, said screen having a plurality of lenticular elements arranged in a regular array, and said plurality of elements provided in a 1:1 or larger ratio of small integers to the projected images of such image forming segments.

2. The system of claim 1 wherein said ratio is of integers at least as small as 5.

3. The system of claim 1 wherein such film segments are parallel stripes and said lenticular elements are contiguous rib-like lenticular elements having their longitudinal axis disposed in parallel relation to the projected images of such stripes.

4. The system of claim 3 wherein said ratio of small integers is of integers at least as small as 3.

5. The system of claim 1 wherein such film segments are parallel stripes, said lenticular elements are arranged in parallel relation to the projected images of such stripes and said ratio is 3 to 2.

6. The system of claim 1 wherein such image forming segments are color stripes arranged in substantially parallel relation in a repetitive sequence to produce a colored image and said lenticular elements are substantially contiguous rib-like lenticular elements having their longitudinal axes disposed in parallel relation to the projected images of such stripes.

* * * * *